INVENTORS
ARTHUR G. ANDERSON
JOHN W. HORTON
BY
Van Deventer & Shively
ATTORNEYS

INVENTORS
ARTHUR G. ANDERSON
JOHN W. HORTON
BY
Van Deventer & Shively
ATTORNEYS

United States Patent Office 2,757,359

Patented July 31, 1956

2,757,359

SPIN ECHO STORAGE SYSTEMS

Arthur G. Anderson, Riverdale, and John W. Horton, New York, N. Y., assignors to International Business Machines Corporation, a corporation of New York Application December 30, 1954, Serial No. 478,596

9 Claims. (Cl. 340—173)

The present invention pertains to improvements in spin echo storage systems.

An object of the invention is to provide a method of entering a plurality of differing blocks of information in a storage medium by means of radio-frequency pulses applied thereto and selectively extracting any desired block in the form of spin-echoes produced by free nuclear induction.

A further object is to provide a method of the above nature which includes labelling each block of information at its particular time address in the entry train by means of a distinctive pulse of magnetic field inhomogeneity, and applying a corresponding field pulse at read-out time.

A further object is to establish the distinction between labelling pulses applied to the respective information blocks by producing these pulses with differing inhomogeneity-time areas.

Another object is to provide the distinctive labelling by magnetic field pulses whose causative fields differ spatially with respect to each other and to the main magnetic fields of the system.

A further object is to provide suitable apparatus for carrying out the above methods.

Figure 1:
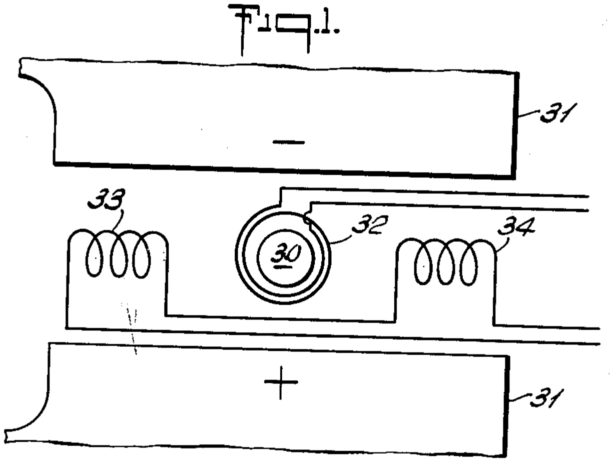
Figure 2:
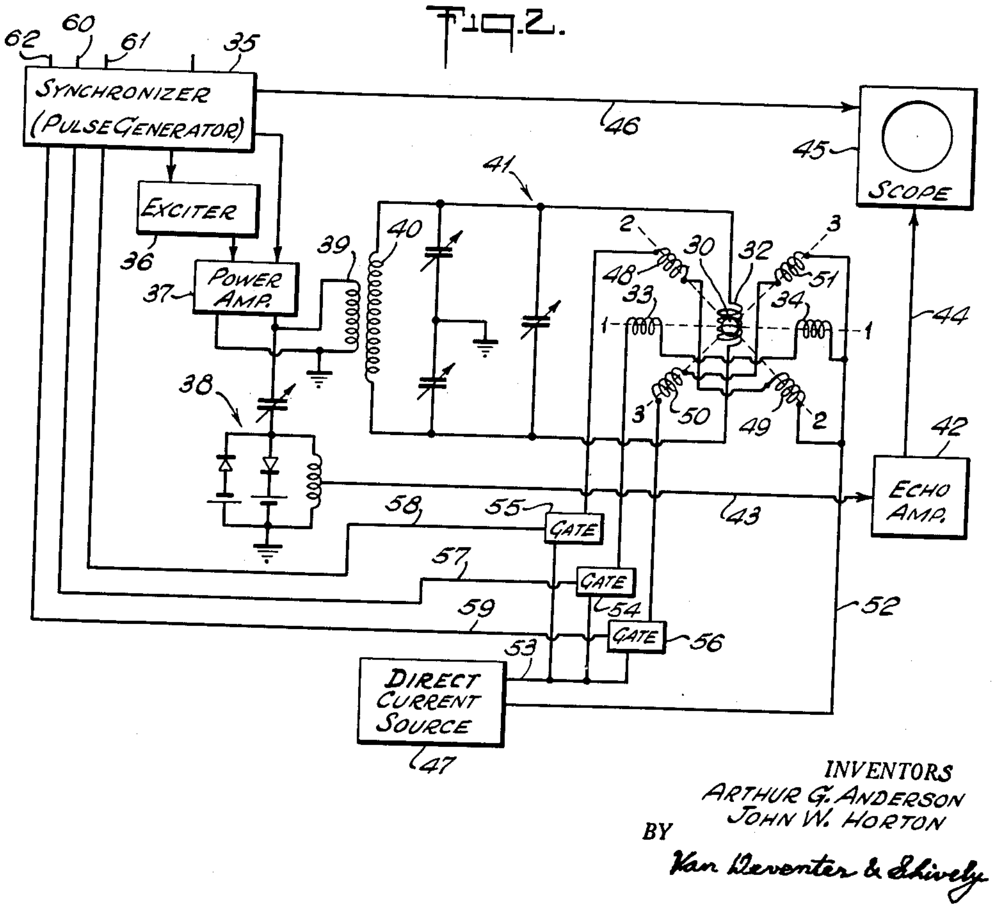
Figure 3:
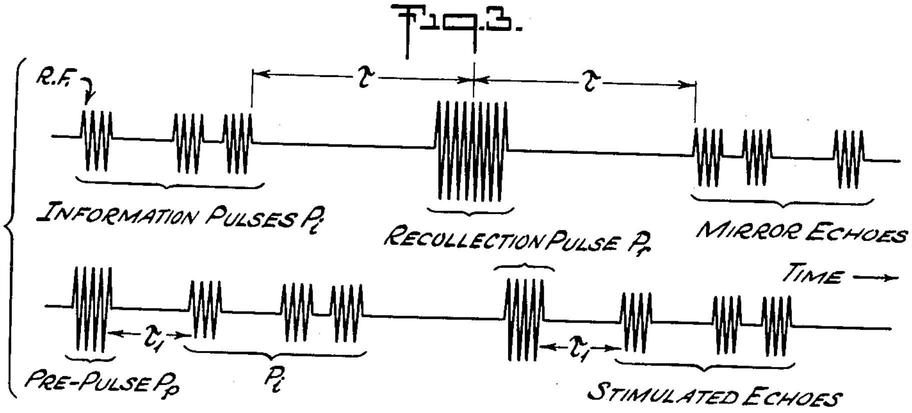
Figure 4:
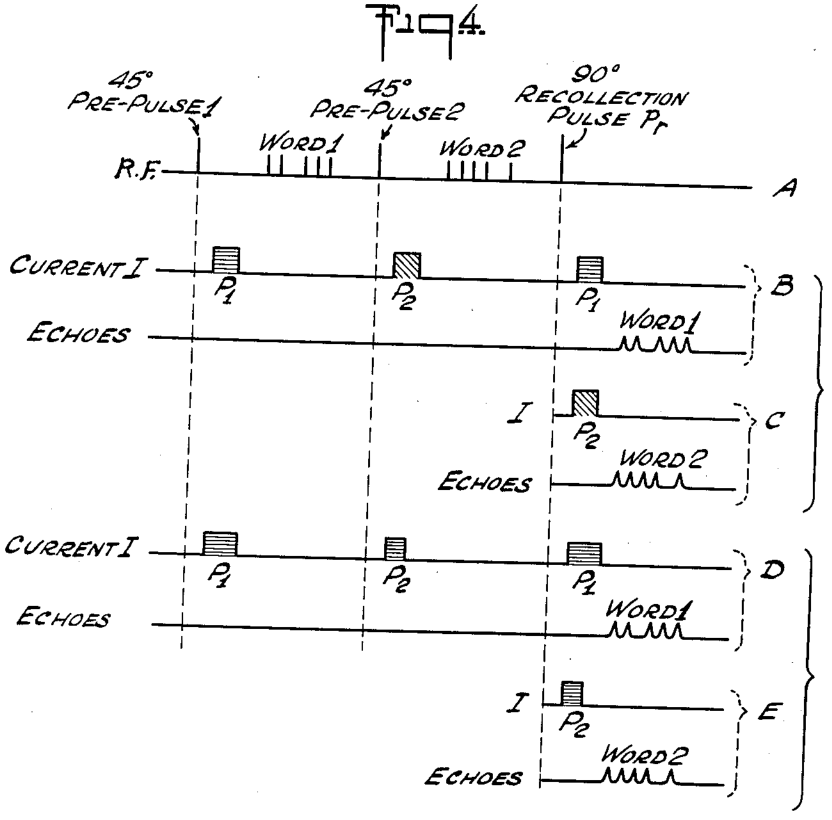

Other objects and advantages of the invention will become evident during the course of the following description in connection with the accompanying drawings, in which Figures 1 and 2 are diagrams jointly illustrative of typical apparatus for practicing the multiple address storage and extraction process;

Figure 3 comprises a pair of time diagrams illustrating comparatively the two principal types of spin-echoes, and Figure 4 is a set of parallel time diagrams showing the process by which the multiple address entries and selective extraction of information are accomplished.

Spin-echo technique, based generally on the behavior of spinning gyroscopic particles in aligning or polarizing fields, may best be illustrated as applied to atomic nuclei affected by a strong magnetic field and producing the desired echo effects due to free nuclear induction. The phenomenon of free nuclear induction per se has been set forth in U. S. Patent No. 2,561,489 to F. Bloch et al., as well as in various well-known scientific publications by Bloch and by Purcell. The extension of the effect to produce spin-echoes, the work of E. L. Hahn, was described by the latter scientist in an article entitled "Spin Echoes," published in Physical Review, November 15, 1950. As the above publications are readily available in the public domain, repetition herein of the entire complex mathematical analysis contained in them is obviously unnecessary. However, in order to set forth most clearly the nature and advantages of the present invention, it is appropriate first to describe briefly the pertinent general principles of spin echo technique.

Nuclear induction, while in itself a magnetic effect, is based on a combination of magnetic and mechanical properties existing in the atomic nuclei of chemical substances, good examples being the protons or hydrogen nuclei in water and various hydrocarbons. The pertinent mechanical property possessed by such a nucleus is that of spin about its own axis of symmetry, and as the nucleus has mass, it possesses angular momentum of spin and accordingly comprises a gyroscope, infinitely small, but nevertheless having the normal mechanical properties of this type of device. In addition, the nucleus possesses a magnetic moment directed along its gyroscopic axis. Thus each nucleus may be visualized as a minute bar magnet spinning on its longitudinal axis. For a given chemical substance, a fixed ratio exists between the magnetic moment of each nucleus and its angular momentum of spin. This ratio is known as the gyromagnetic ratio, and is normally designated by the Greek letter $\gamma$.

A small sample of chemical substance, such as water as previously noted, obviously contains a vast number of such gyroscopic nuclei. If the sample is placed in a strong unidirectional magnetic field these spinning nuclei align themselves with their magnetic axes parallel to the field, after the manner of a large gyroscope standing erect in the Earth's gravitational field. In the aggregate, whether the various nuclear magnetic moments are aligned with or against the field is determined largely by chance, but while a large number aligned in opposite directions cancel each other, there always exists a net preponderance in one direction which for analysis may be assumed as with the field. Thus the sample, affected by the magnetic field, acquires a net magnetic moment $M_0$ and a net angular momentum $I_0$, which two quantities may be represented as the vector sums of the magnetic moments and spins of all the nuclei concerned.

So long as the sample remains undisturbed in the field, the gyroscopic nuclei remain in parallel alignment therewith as noted. If, however, a force is applied which tips the spinning nuclei out of alignment with the main field, upon release of the displacing force the spinning nuclei, urged again toward realignment by the force of the field, rotate or precess about the field direction in the familiar gyroscopic manner. Precession occurs with a radian frequency $\omega_0 = \gamma H_0$ where $H_0$ is the field strength affecting each nucleus and $\gamma$ is the previously noted gyromagnetic ratio. This precessional frequency $\omega_0$ is termed the Larmor frequency, and since for any given type of nuclei $\gamma$ is a constant (for example $2.68 \times 10^4$ for protons or hydrogen nuclei in water), it is evident that the Larmor frequency of each precessing nucleus is a direct function of the field strength affecting that particular nucleus. It will further be evident that if the field strength $H_0$ is of differing values in different parts of the sample, the groups of nuclei of these various parts will exhibit net magnetic moments precessing at differing Larmor frequencies.

It is upon the above described characteristics of differential precession in an inhomogeneous field that the technique of spin-echoes is based. For clarity in the following general explanation, it is first appropriate to describe briefly an example of suitable apparatus for producing the effects, such apparatus being shown diagrammatically in Figures 1 and 2. Referring first to Figure 1, the numeral 30 designates a sample of chemical substance, for example water or glycerine, in which information is to be stored. The sample 30 is disposed between the pole faces of a magnet 31, preferably of the permanent horn type, but which of course if desired may be instead the electromagnetic equivalent. The main magnetic field $H_0$ exists in the vertical direction, while a radio-frequency coil 32 is arranged to supply a field with its axis into or out of the paper of the diagram, the R. F. field thus being perpendicular to the $H_0$ field. A pair of direct current coils 33 and 34, arranged as shown diagrammatically with respect to the magnet 31 and R. F. coil 32, are provided to introduce additional field inhomogeneities. In the present invention the coils 33 and 34 together may comprise one of a plurality of pairs of similar coils arranged at differing angles about the sample 30, but as the spatial situation of the other pairs prevents their proper illustration in Figure 1, these coils are shown in Figure 2 and their functions will be described later in connection therewith.

Figure 2 illustrates by semi-block diagram a typical electrical arrangement by which the impulses may be stored and echoes recovered from the sample 30. Inasmuch as the internal structures and modes of operation of the labelled block units are in general well known in the electronic art, description thereof will properly be limited to that necessary to explain the manner in which or with what modification they play their parts in carrying out the present invention.

A synchronizer or pulse generator 35 originates pre-pulses, recollection pulses, and entry or storage pulses required by the system. An exciter unit 36, controllable by the pulse source 35 and comprising an oscillator and a plurality of frequency doubling stages, serves as a driving unit for the R. F. power amplifier 37. In the production of a pulse the source 35 first energizes the exciter 36 to place an R. F. driving signal on the amplifier 37, then "keys" the amplifier to produce an output signal therefrom. This output is routed via a tuning network 38 to a coil 39 which is inductively coupled to a second coil 40 adapted to supply energy to a circuit network 41, the latter including the previously described R. F. coil 32, Fig. 1, containing the sample 30. A signal amplifier 42 has its input conductor 43 connected into the network 38, so that any echo signal induced in the R. F. coil 32 and transmitted back via the coils 40 and 39 is impressed on this amplifier. The output 44 of the amplifier 42 is directed to suitable apparatus for utilization of the echo pulses, such apparatus being illustrated herein by an oscilloscope 45 provided with a horizontal sweep control connection 46 with the synchronizer 35.

A D. C. source 47 is adapted to supply current to the previously noted D. C. coils for purposes to be hereinafter explained at length. The coil combination, in addition to the previously noted pair 33, 34, comprises two additional pairs 48, 49 and 50, 51. The two coils of each pair are wound in bucking relationship, with a common axis traversing the sample 30, but these respective axes 1, 2 and 3 of the three pairs are orientated at differing angles as shown. All three pairs, which for convenience will hereinafter be referred to as pairs 1, 2 and 3 in the order of their respective axes, are connected on one side each to one output conductor 52 of the D. C. source 47. The other terminals of coil pairs 1, 2 and 3 are connected to the second D. C. output conductor 53 via suitable respective gating units 54, 55 and 56 having driving connections 57, 58 and 59 from the synchronizer 35. The numerals 60, 61 and 62 indicate input connections by which the synchronizer may be conditioned to supply control pulses in accordance with the particular computing or analytical service to which the invention may be applied.

In initiating spin-echo effects, the sample 30 is first subjected to the polarizing magnetic field $H_0$ for sufficient time to allow its gyromagnetic nuclei to become aligned as previously described. Taking the simplest case of a single echo production, the sample is then subjected to a pulse of an alternating magnetic field $H_1$ produced by R. F. alternating currents in the coil 32 and hence normal to the direction of the main field $H_0$. This R. F. magnetic field pulse exerts a torque on the spinning nuclei which tips them out of alignment with $H_0$, so that as the pulse terminates the nuclei begin to precess about the main field direction, conveniently termed the Z-axis, with their characteristic Larmor frequencies. Their magnetic moments or components thereof thus rotate in a plane normal to the Z-axis, which plane accordingly may be termed the XY plane. Taking for example the behavior of a related group of spinning nuclei as characteristic of all such particles in the sample, it will be evident that the inhomogeneity of the field $H_0$ in different parts of the sample gives rise to the previously explained differential Larmor precession, so that while the group as a whole continues to rotate at a mean rate $\omega_0$, the constitutent moments of the group fan out or separate from each other at rates dependent on their particular differences in Larmor frequency. So long as this spreading condition persists, the diffusion of the constituent moments of the group prevents their cooperation to generate a signal.

To initiate echo formation, the sample is subjected to a powerful torsional R. F. pulse, termed the "recollection" pulse, which in effect changes the divergence of the constituent moments to convergence. With maintenance of proper time and field condition relationship, as further noted hereinafter, the rotating moments eventually return to coincidence, at which point they reinforce each other to induce a signal in the R. F. coil 32, this signal being the "echo" of the "entry" R. F. pulse which initiated the sequence. The signal is transmitted to the amplifier 42, amplified, and directed to the oscilloscope 45 or other device for utilization.

The above description, as noted, set forth for illustration the simple case of a single echo, in which case the maximum echo signal would normally be produced by applying an "entry" pulse sufficient to tip the moment group through 90°, i. e., completely into the XY plane. Lesser angles of tip also produce useful moment groupings, so that by applying successive entry pulses of proper duration and amplitude, a plurality of entries may similarly be made to produce a corresponding train of echoes. However, in this and all other variations of the process as hereinafter set forth, it will be understood that the basis of echo production is the same, namely the systematic disassembly and subsequent systematic reassembly of related moments of spinning particles in a suitable field.

In practice, there are two important types of procedure in spin-echo formation, namely the "mirror echo" process and the "stimulated echo" process, illustrated in comparison in Figure 3. In this figure the ordinate represents the voltage across the terminals of the R. F. coil 32 containing the sample, while the abscissa represents time. In order to make illustration feasible, the echo pulses have been drawn $10^5$ times larger than they would be on a scale of the ordinate suitable for drawing the storage and recollection pulses. The duration of each storage pulse may be of the order of a few microseconds, whereas the times $\tau$, which are the "memory" or "storage" intervals, may be for example of the order of seconds when water is used as a storage medium comprising the sample 30.

The difference in storage methods for "mirror" and "stimulated" echo production, which is a fundamental distinction, has been set forth in detail in the previously mentioned scientific publication and therefore need be reviewed only in pertinent relation to the present invention. In mirror storage, as illustrated, the entry pulses, applied to the nuclei as previously explained, precede the recollection pulse in their chosen order, while the echoes follow the recollection pulse in reverse order. Thus it will be seen that the echo and storage pulses have "mirror" symmetry with respect to the center of the recollection pulse, hence the characteristic name for this type of echo procedure.

In the case of the stimulated echo process, as shown in the diagram, an R. F. "pre-pulse" $P_p$ is first applied to the sample. This pre-pulse, in the simplest case shown for purposes of explanation, is of sufficient amplitude and duration to tip all the nuclear moments of the sample substantially through 90 degrees, i. e., into the XY plane, where during a time interval $\tau_1$ they are permitted to spread and distribute themselves throughout the plane by differential Larmor precession as previously explained. Following the time interval $\tau_1$ the storage pulses are applied, these pulses having the effect of depositing groups or "families" of moment vectors on a system of cones revolving about the Z-axis or direction of the field $H_0$, i. e., the pulses may be described as entered into "Z-axis storage."

The recollection pulse $P_r$ is of proper duration and amplitude to tip the revolving moment cones again into the XY plane, at the same time having the effect of reversing the relative angular motions among the constituents of each moment group. Thereupon the constituents of the respective groups re-assemble to induce echo pulses in the coil 32, these pulses starting at the end of a second time period $\tau_1$ after the recollection pulse and appearing in the same order as their corresponding entry pulses. Thus the figure for the stimulated echo process will be seen to have "translational" symmetry in the relation of the entry pulses to the pre-pulse and the echoes to the recollection pulse.

If the condition of the magnetic field $H_0$ were to remain constant throughout, it will be evident that the above described "mirror" and "translational" symmetries necessary for echo production would be symmetries purely in time. However, if the inhomogeneity of $H_0$ changes, the change introduces a second factor of field condition which must be considered together with the time factor and in integrated relation thereto. The present invention utilizes this necessary integrated relationship to provide multi-address storage of information and selective read-out thereof. While the method can be applied to either mirror or stimulated type echo formation, in practice the latter's characteristics of substantially immediate read-out in normal order following the recollection pulse render it generally preferable, for which reason the following description will be directed to the stimulated echo type of operation.

The integrated relationship necessary for the production of an unattenuated stimulated echo from any information pulse $p_i$ may be expressed, for all points in the sample:

$$\int_{t_1}^{t_2} \Delta H_0 dt = \int_{t_3}^{t_4} \Delta H_0 dt$$

where $t_1$ is the termination of the controlling pre-pulse, $t_2$ is the time of the information pulse $p_i$, $t_3$ in the termination of the recollection pulse, and $t_4$ is the time of the resultant echo, this latter time being generally defined by $t_4-t_3=t_2-t_1$. In the present invention, as previously mentioned, changes in the field inhomogeneity $\Delta H_0$ are produced by directing current impulses through the D. C. bucking coils. The effects of such pulses on the magnetic field are to change $\Delta H_0$ not only in amplitude but also in local character, i. e., the changes in field affecting different nuclei throughout the sample are not proportional to those affecting these particular nuclei when the field is undisturbed. However, it will be evident that if any such change be introduced immediately following a pre-pulse and then be duplicated immediately after the recollection pulse, the above noted condition of translational integral symmetry in time and field condition may be accomplished, resulting in echo reproduction of the entered information pulse arrangement. On the other hand, if the second pulse differs in such manner that the required symmetry is not possible, no corresponding echoes will appear.

The present invention employs the above relationships as follows:

The information entering period of the process is divided into a plurality of "addresses" or individual word entering periods, each starting with its individual pre-pulse which, instead of being of 90° as in the simple case, may be of the order of $$\frac{90°}{N}$$

where N is the number of "words" to be stored. Following each pre-pulse, and before the entry of the desired "words" or combinations of information pulses, a pulse of field inhomogeneity change is applied, these latter pulses differing from each other in the different address period so as to comprise "labelling" means for the particular respective words entered therein. After all words have been entered, and when it is desired to extract or read out a particular word from the store, an R. F. recollection pulse is applied, followed by a field pulse duplicating the previous labelling pulse of the selected word. For that particular word the required translational symmetry becomes present, but due to their different labelling the other stored words are denied such symmetry. As a result, the desired word is reproduced as an echo train, while the others are ignored.

The echo signal amplitude due to the splitting of a given total number of information pulses into N words can be shown to be approximately proportional to $$\frac{1}{\sqrt{N}}$$

for the selective single read-out of any word. Thus it will be evident that the number of words which may be stored is a function of the available practical strength of the echo response. However, as the discriminatory process between words is the same regardless of their number, for simplicity it is illustrated as between two words 1 and 2, Fig. 4. Similarly, while various ways of producing essential differences in labelling pulses are available, Fig. 4 typically illustrates the two principal types, lines A, B and C illustrating the use of one type while lines A, D and E show the second.

Referring first to Fig. 4, A, it will be seen that R. F. pre-pulse 1 is followed by information pulses comprising word 1, while pre-pulse 2 is followed by information pulses differently ordered to represent word 2. Following pre-pulse 1, as shown in line B, a current pulse $P_1$ is directed through the pair 1 of magnet coils via the gate 54 under control of the synchronizer 35, Fig. 2, producing a particular arrangement of field inhomogeneity change affecting the sample 30. Following pre-pulse 2, a current pulse $P_2$ is directed through pair 2 of magnet coils. Pulse $P_2$ may be, if desired, of the same magnitude and duration as $P_1$, but due to the different orientation or spacial relation of coil pair 2 respecting the main fields and the sample 30, the nuclei of the latter are subjected to a different relative arrangement of field distortion, i. e., the changed conditions of $\Delta H_0$ produced by the two pulses are not identical. Thus word 1 and word 2 are distinctively labelled by pulses $P_1$ and $P_2$ respectively, these pulses being shown with differing cross hatching to represent their spatially differing nature. In the same manner, a third pre-pulse and entered word combination may be labelled via the third magnet coil pair 3, etc., extending to any practical number of magnet pairs, but as previously noted, the inter-relation of the two labellings illustrated is fully representative of any number employed. Thus prior to the recollection pulse the sample contains two distinct word combinations in Z-axis storage, words 1 and 2 having field histories corresponding to current pulses $P_1$ and $P_2$ respectively.

Application of the R. F. recollection pulse conditions the vectors of each of the information entries for reassembly provided their respective field histories are reproduced. To read out word 1, current pulse $P_1$, line B, is again directed through the magnet coil pair 1, setting up the proper condition of translational integral symmetry for word 1 but denying it to word 2. Accordingly, the echo signal corresponding to word 1 alone is produced as shown. On the other hand, if labelling pulse $P_2$ is reproduced via the magnet coil pair 2, as shown in line C. the controlling field history of entered word 2 is reproduced and the echoes of word 2 appear while word 1 is excluded. Thus by the method of spacially differing labelling as illustrated by diagram lines A, B and C, Fig. 4, selective read-out of any desired word may be obtained by proper D. C. pulsing via the synchronizer 35.

The procedure illustrated jointly by lines A, D and E, Fig. 4, is the same as described above except that the labelling pulses $P_1$ and $P_2$ may be supplied by the single magnet coil pair 1 with differing areas of $I\Delta t$, that is, the products of the respective current amplitudes and durations and hence the respective field histories set up, differ for the two stored word combinations. As before, reproduction of either $P_1$ or $P_2$ results in the selective read-out of word 1 or word 2 as shown respectively in line combinations D and E. Thus the same selective result may be obtained by either "spatial" labelling or "area" labelling. However, combinations of the two methods may also be used, i. e., any or all of the various D. C. magnet coil sets can be employed with unequal area $I\Delta t$ pulses to multiply the number of selections available with a given number of magnet sets and a given number of differing area pulse provisions. It will further be evident that while the invention has been illustrated typically in preferred form, it is not limited to the precise embodiments set forth, as obviously various modifications may be made without departing from the scope of the appended claims.

We claim:

1. Apparatus for storing information in and selectively extracting said information from a sample of chemical substance by nuclear induction comprising, in combination, timing means to establish an operational succession including an information-storage period and a read-out period, means to apply a polarizing field throughout said sample to polarize gyromagnetic particles thereof, means controllable by said timing means to apply torsional radio-frequency information pulses to said gyromagnetic particles in predetermined combinations in successive time zones within said storage period and to apply a radio-frequency recollection pulse for initiating said read-out period, means controllable through said timing means to apply characteristically differing labelling pulses of field inhomogeneity alteration to said sample in said respective time zones and to reproduce any selected one of said labelling field pulses in said readout period, whereby precession to constructive magnetic interference among said particles may form echo pulses correspondent to said information pulse combination stored in said time zone labelled by said selected field pulse, and means to detect said echo pulses.

2. The combination claimed in claim 1 wherein said labelling pulse applying means includes a plurality of magnet coil combinations disposed adjacent said sample in spatially differing relation, each of said coil combinations when energized being adapted to apply a characteristic magnetic distortion to said polarizing field, and means controllable through said timing means to selectively supply direct current to said magnet combinations.

3. The combination claimed in Claim 1 wherein said labelling pulse applying means includes a plurality of magnet coil combinations disposed adjacent said sample and having axes angularly spaced with relation to each other and said polarizing field, a source of direct current, and means controllable through said timing means to selectively connect said current source with said magnet coil combinations.

4. That spin echo method of information storage in a sample of chemical substance during a storage period and subsequent selective recovery of said information during a read-out period by controlled differential precession of gyroscopic particles of said sample in a polarizing field, which includes the steps of applying predetermined combinations of torsional radio-frequency information entering pulses to said gyroscopic particles in successive time zones within said storage period, applying characteristically differing pulses of field inhomogeneity alteration to said particles in said successive time zones whereby each of said stored information combinations may be distinctively labelled, applying a torsional radio-frequency recollection pulse to said particles to initiate said read-out period, selectively duplicating any chosen one of said distinctive labelling pulses of field inhomogeneity in said read-out period, whereby said particles may precess to constructive interference to form echo pulses correspondent solely to said stored combination labelled by said chosen pulse, and detecting said echo pulses.

5. A method according to claim 4 wherein said labelling pulses comprise pulses of distortion applied to said field and distinctively differing in area combination of amplitude and duration.

6. A method according to claim 4 wherein said labelling pulses comprise pulses of distortion applied to said field in spatially differing relation to each other and to said field.

7. That spin echo method of information storage in a sample of chemical substance during a storage period and subsequent selective recovery of said information during a read-out period by controlled differential precession of gyroscopic particles of said sample in a polarizing field, which includes the steps of applying a plurality of torsional radio-frequency controlling pre-pulses to said particles to divide said storage period into successive time zones, applying predetermined combinations of torsional radio-frequency information entering pulses in said time zones, applying characteristically differing pulses of field inhomogeneity alteration to said particles in said successive time zones whereby each of said stored informational combinations may be distinctively labelled, applying a torsional radio-frequency recollection pulse to said particles to initiate said read-out period, selectively duplicating any chosen one of said distinctive labelling pulses of field inhomogeneity in said read-out period, whereby said particles may precess to constructive interference to form echo pulses correspondent solely to said stored combination labelled by said chosen pulse, and detecting said echo pulses.

8. A method according to claim 7 wherein said labelling pulses comprise pulses of distortion applied to said field and distinctively differing in area combination of amplitude and duration.

9. A method according to claim 7 wherein said labelling pulses comprise pulses of distortion applied to said field in spatially differing relation to each other and to said field.

References Cited in the file of this patent

UNITED STATES PATENTS 2,714,714 Anderson et al. ---------- Aug. 2, 1955